(12) United States Patent
Furuya et al.

(10) Patent No.: US 9,759,120 B2
(45) Date of Patent: Sep. 12, 2017

(54) COOLING DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yoshihiro Furuya, Toyota (JP); Yuji Miyoshi, Susono (JP); Satoko Tofukuji, Tokyo-to (JP); Nobuki Kawamoto, Okazaki (JP); Daishi Takahashi, Kanagawa-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/092,803

(22) Filed: Apr. 7, 2016

(65) Prior Publication Data

US 2016/0298526 A1 Oct. 13, 2016

(30) Foreign Application Priority Data

Apr. 9, 2015 (JP) .................................. 2015-080151

(51) Int. Cl.
*F01P 7/14* (2006.01)
*F02F 1/10* (2006.01)
(Continued)

(52) U.S. Cl.
CPC ................. *F01P 7/14* (2013.01); *F01P 7/165* (2013.01); *F01P 11/16* (2013.01);
(Continued)

(58) Field of Classification Search
CPC .... F01P 7/14; F01P 7/165; F01P 7/167; F01P 11/16; F01P 3/00; F01P 3/02; F01P 3/20;
(Continued)

(56) References Cited

U.S. PATENT DOCUMENTS 4,381,736 A * 5/1983 Hirayama ............... F01P 7/164
123/41.1
4,413,596 A * 11/1983 Hirayama ............... F01P 7/165
123/41.1
(Continued)

FOREIGN PATENT DOCUMENTS

| JP | 2004-084526 A | 3/2004 |
| JP | 2013-133746 A | 7/2013 |
| JP | 2013-133747 A | 7/2013 |

*Primary Examiner* — Grant Moubry
(74) *Attorney, Agent, or Firm* — Andrews Kurth Kenyon LLP

(57) ABSTRACT

High temperature (HT) and low temperature (LT) cooling water, the LT cooling water being at a lower temperature than the HT cooling water, circulate in HT and LT cooling water flows in respective channels. A controller controls to set the temperature of the LT cooling water lower in a case where an operating point of an engine lies in a particular region in an operational region of the engine, the particular region including a region in which the load is high and the engine speed is low, than in a case where the operating point lies in an operational region other than the particular region. Furthermore, the controller narrows the particular region in a direction toward higher loads in a case where the temperature of the HT cooling water is lower than a predetermined temperature.

7 Claims, 12 Drawing Sheets

(51) Int. Cl.
 *F02B 29/04* (2006.01)
 *F01P 7/16* (2006.01)
 *F01P 11/16* (2006.01)

(52) U.S. Cl.
 CPC ...... *F02B 29/0443* (2013.01); *F02B 29/0493* (2013.01); *F02F 1/10* (2013.01); *F01P 2007/146* (2013.01); *F01P 2025/42* (2013.01); *F01P 2060/02* (2013.01)

(58) Field of Classification Search
 CPC ............ F01P 2007/146; F01P 2025/08; F01P 2025/42; F01P 2025/62; F01P 2060/02; F01P 2003/001; F01P 2003/021; F01P 2003/024; F01P 2003/027; F02B 29/0443; F02B 29/0493; F02B 29/0406; F02B 29/0437; F02F 1/02; F02F 1/10; F02F 1/14; F02F 1/26; F02F 1/36; F02F 1/40; F02F 2001/106
 USPC ..... 123/41.29, 41.31, 41.42, 41.72, 41.82 R, 123/41.81
 See application file for complete search history.

(56) References Cited

U.S. PATENT DOCUMENTS

| | | | | |
|---|---|---|---|---|
| 4,730,579 A | * | 3/1988 | Yamada | ................. F01P 3/02 123/193.5 |
| 8,746,187 B2 | * | 6/2014 | Nogawa | ................. F01P 3/02 123/41.82 R |
| 2003/0000487 A1 | * | 1/2003 | Schmitt | ................. F01P 3/02 123/41.72 |

* cited by examiner

{Fig. 1}
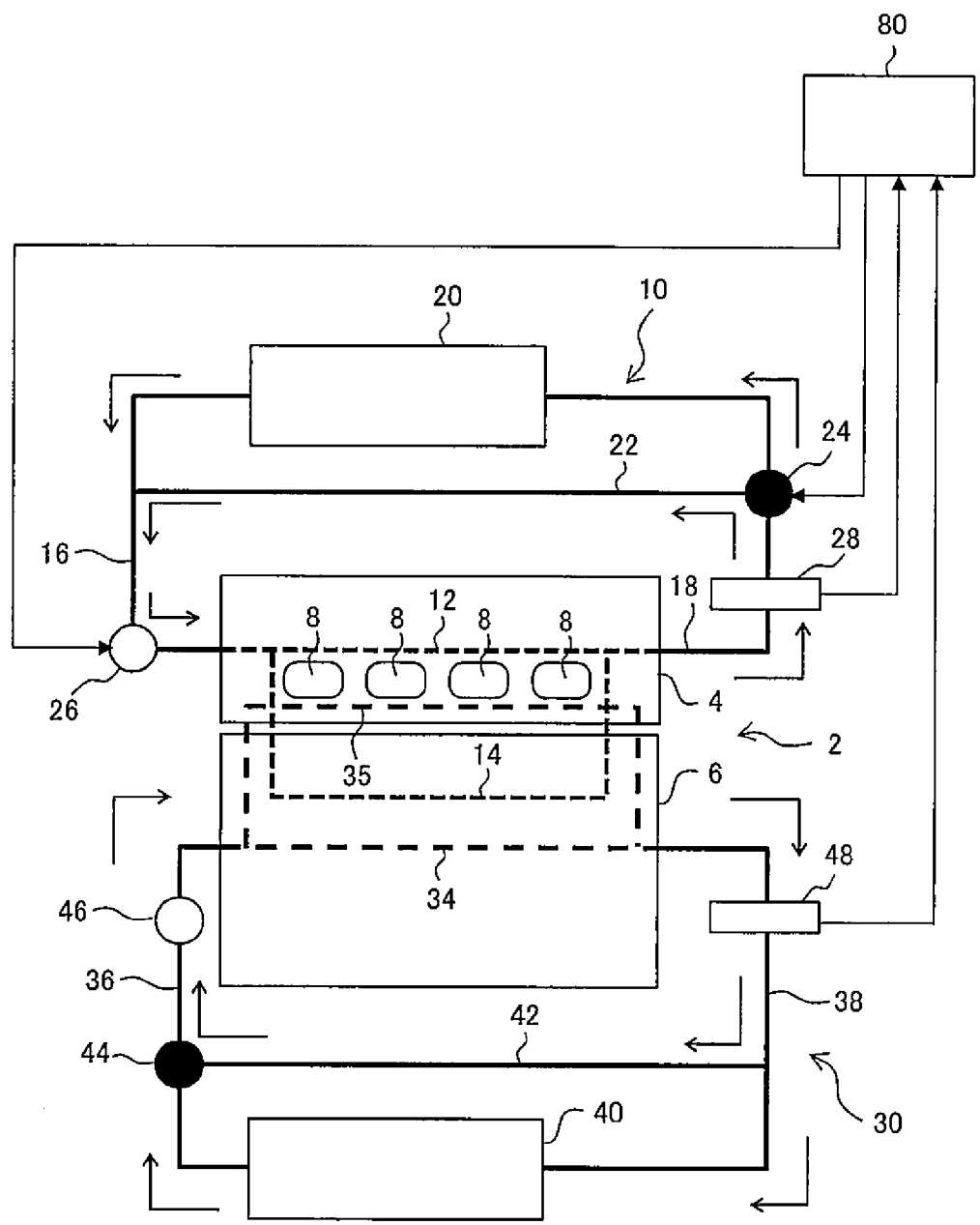

{Fig. 2}
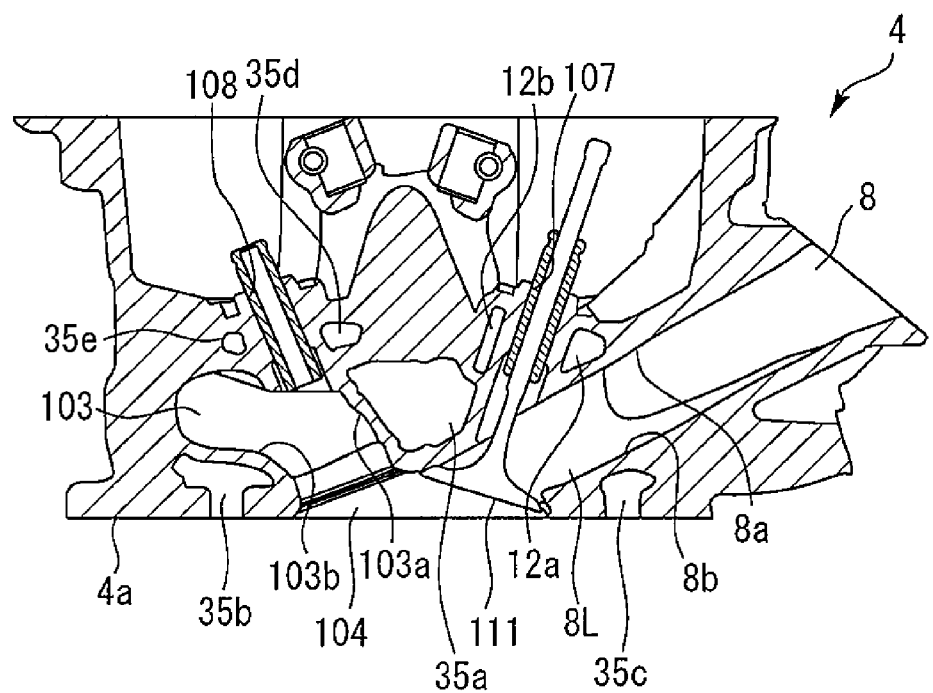
{Fig. 3}
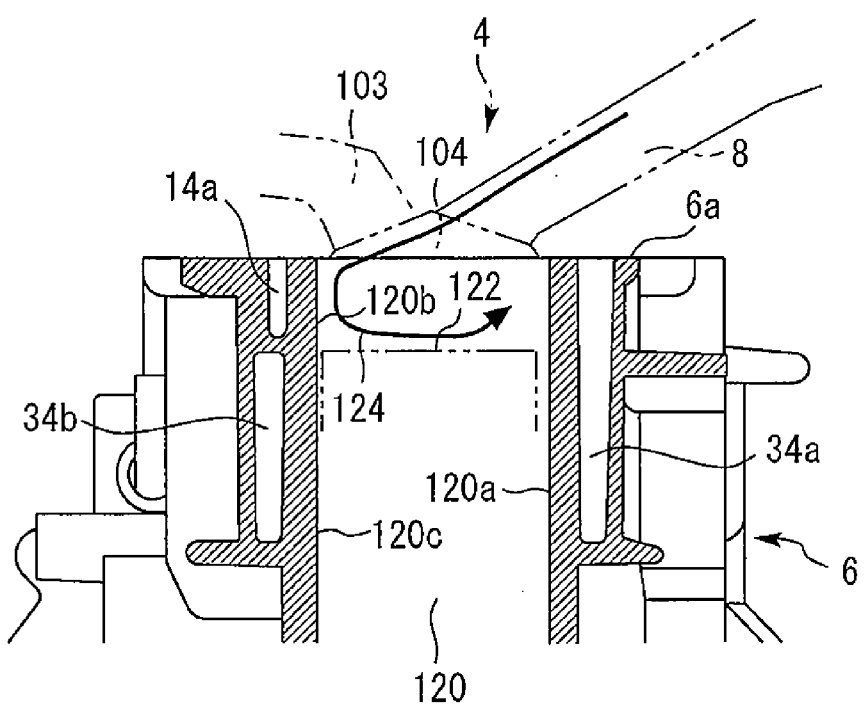

{Fig. 4}
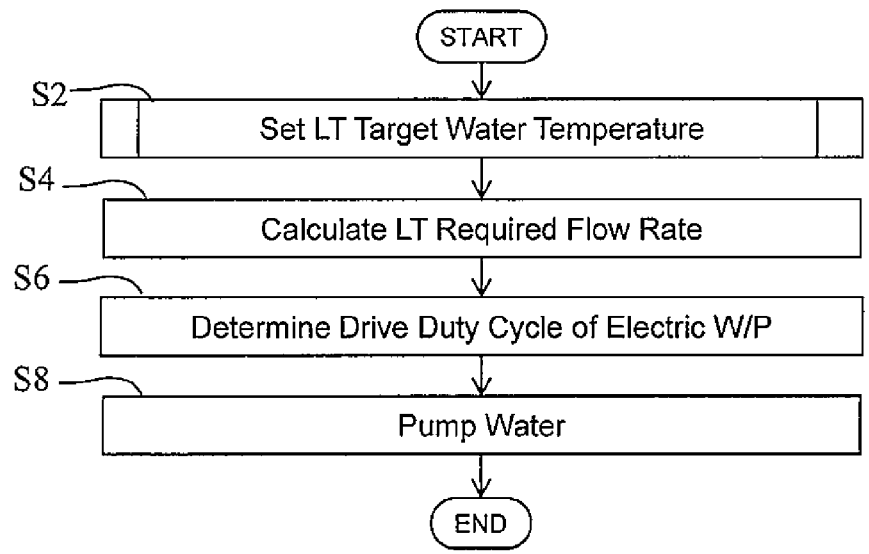

{Fig. 5}
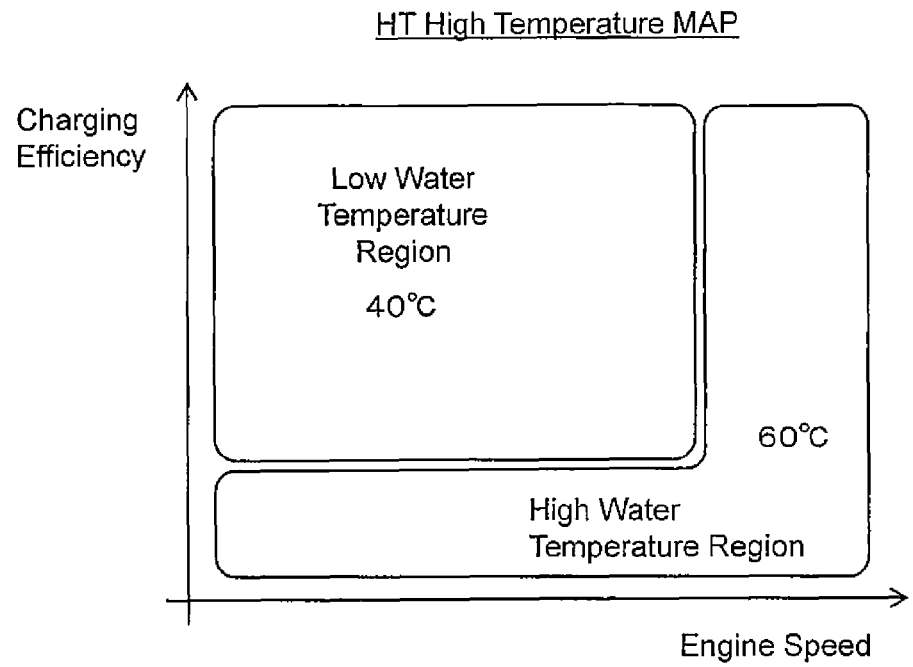
{Fig. 6}
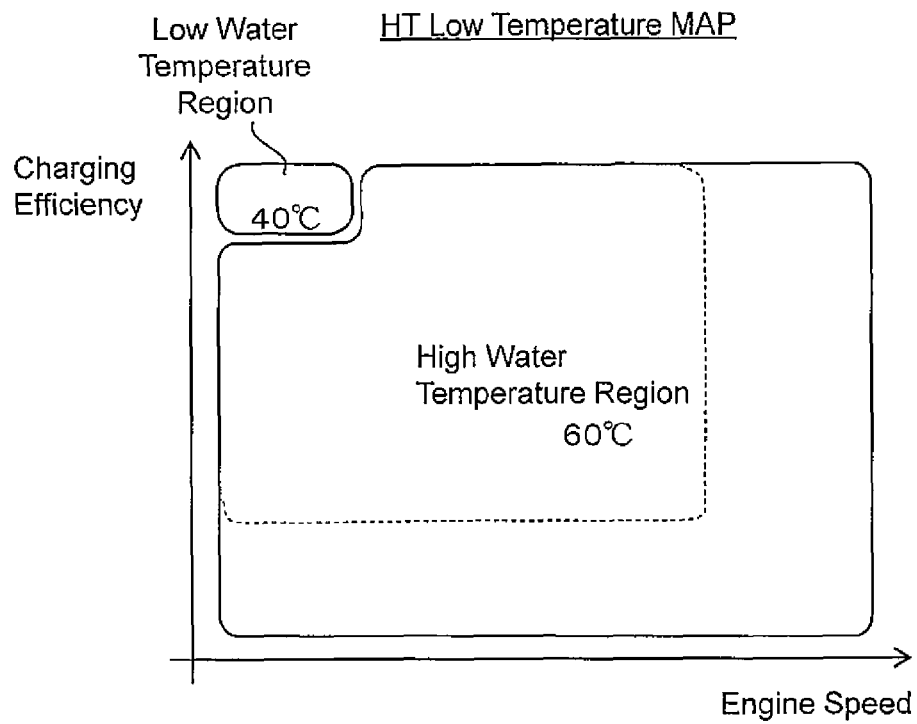

{Fig. 7}
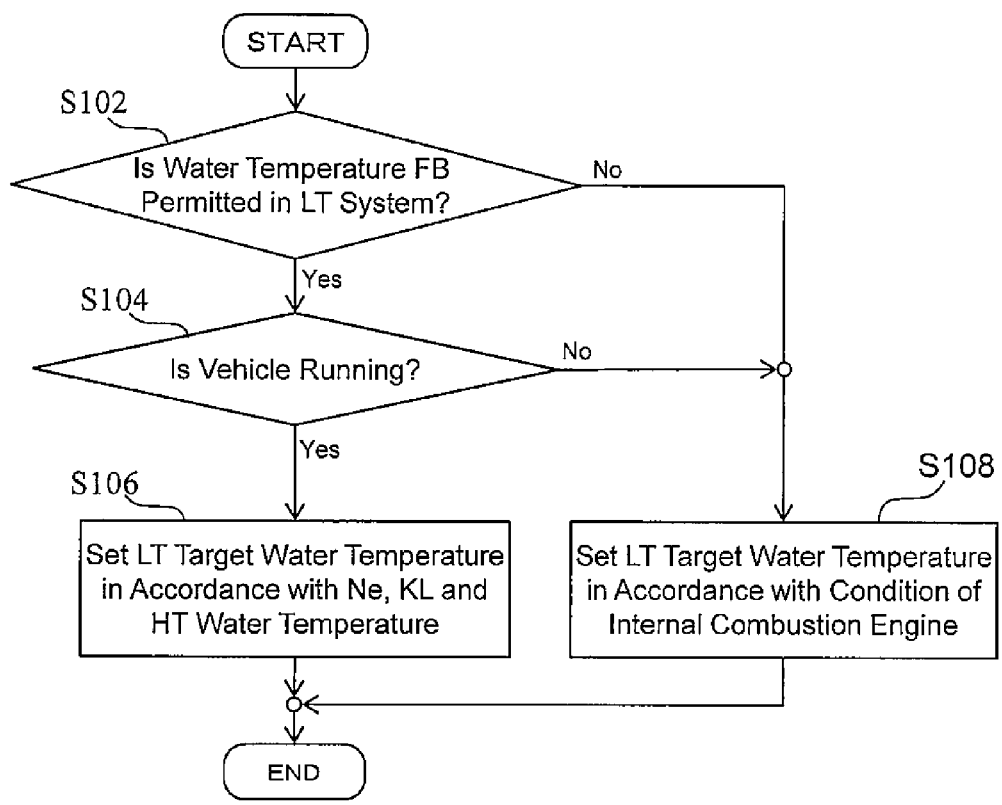

{Fig. 8}
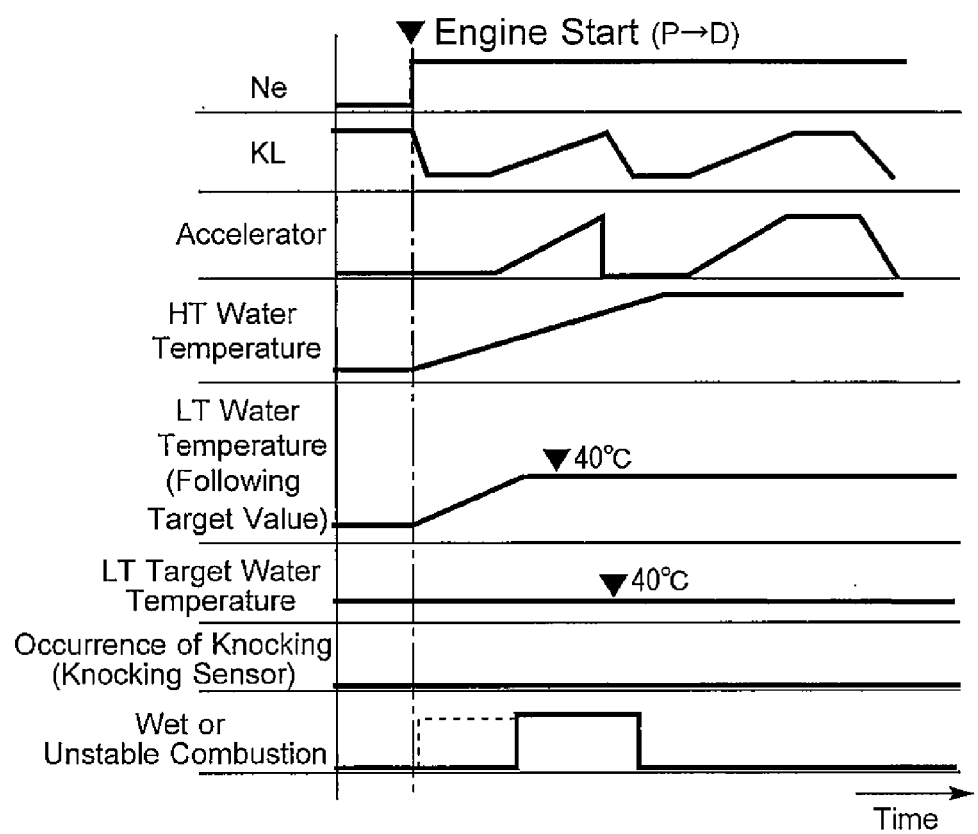

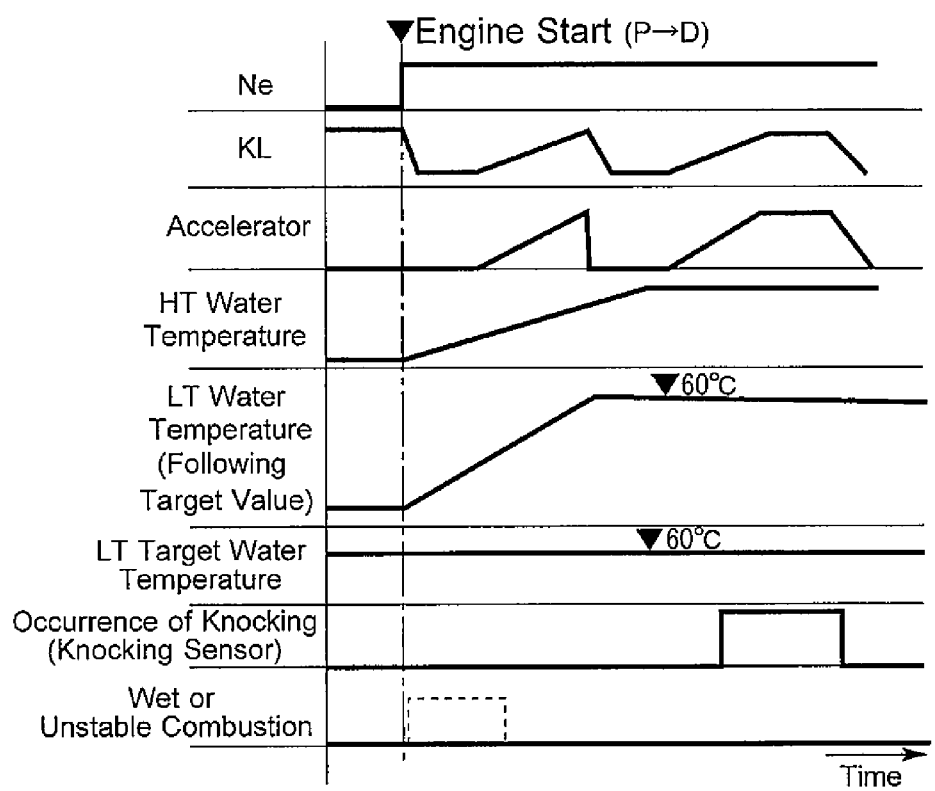

{Fig. 10}
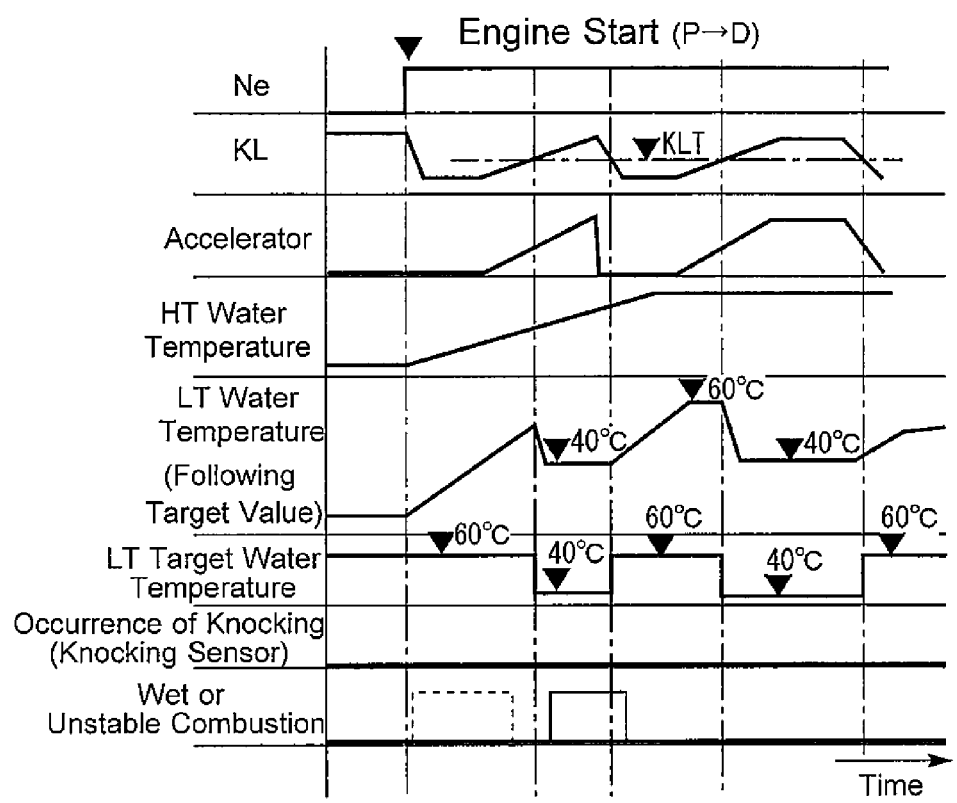

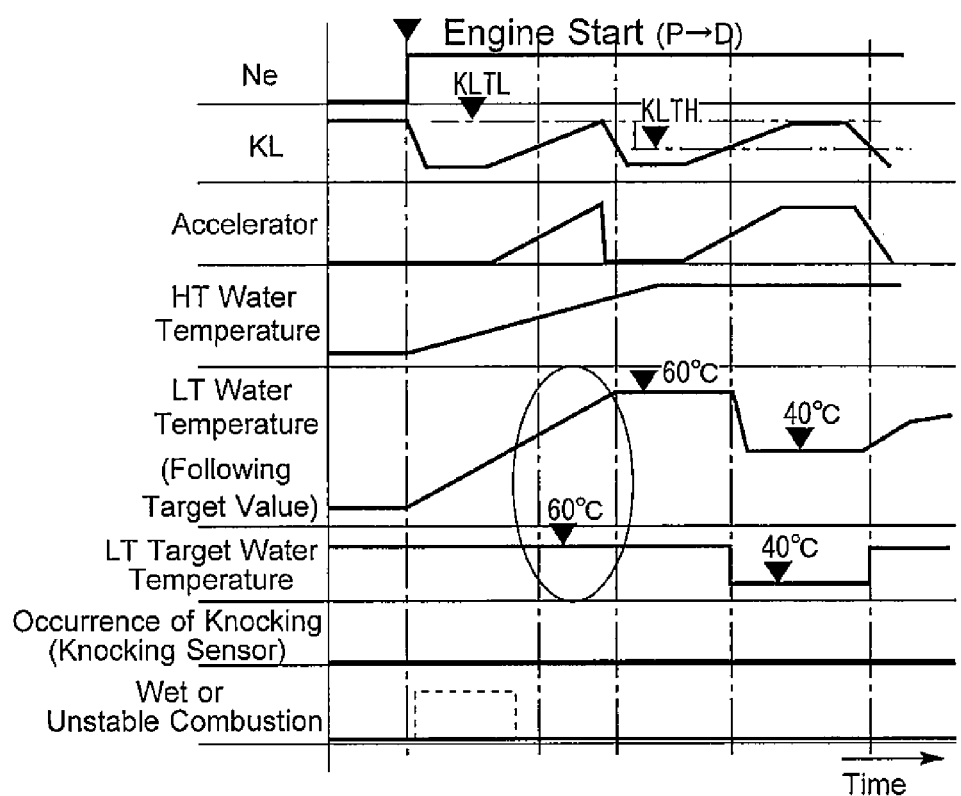
{Fig. 11}

{Fig. 12}
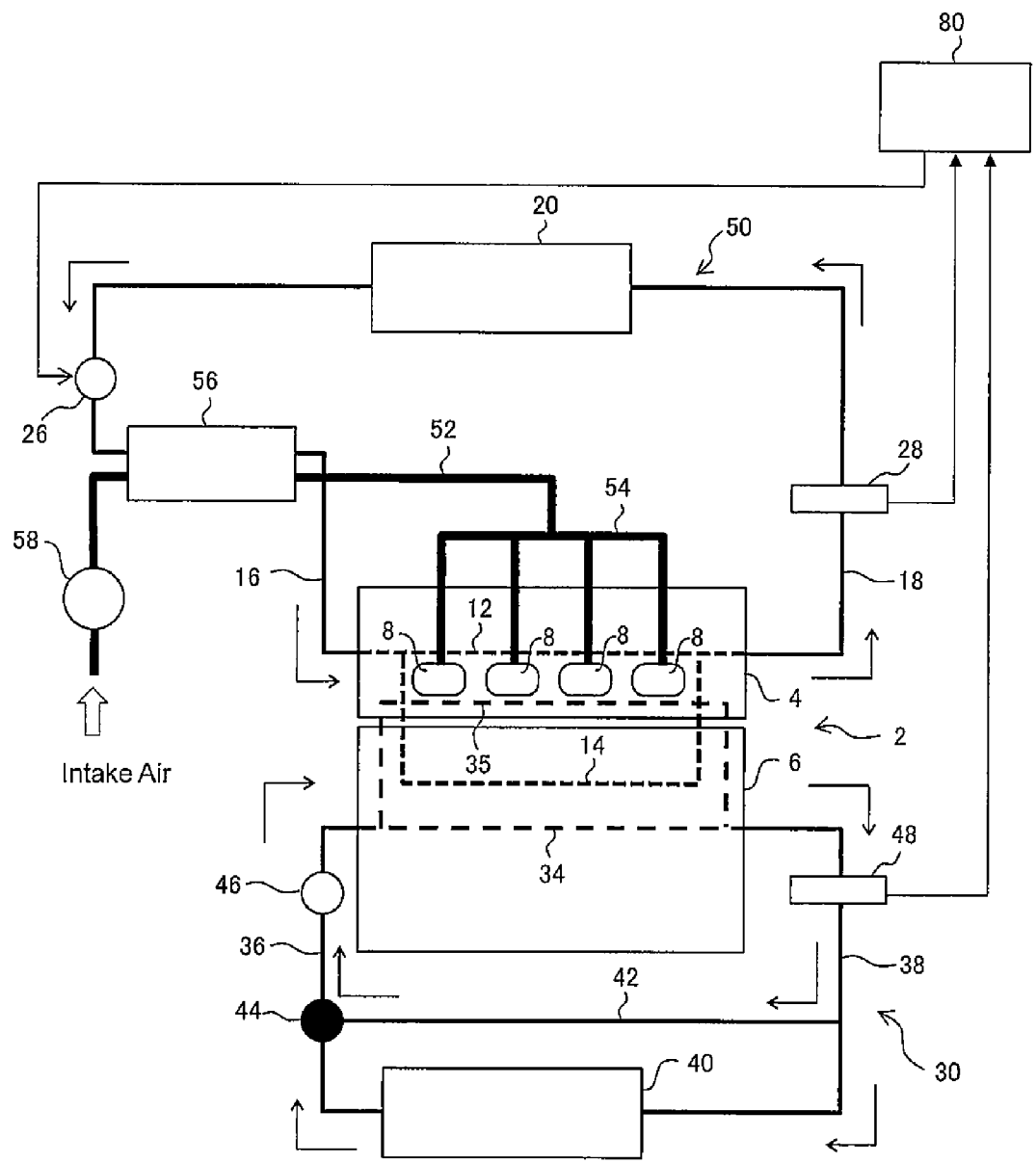

{Fig. 13}
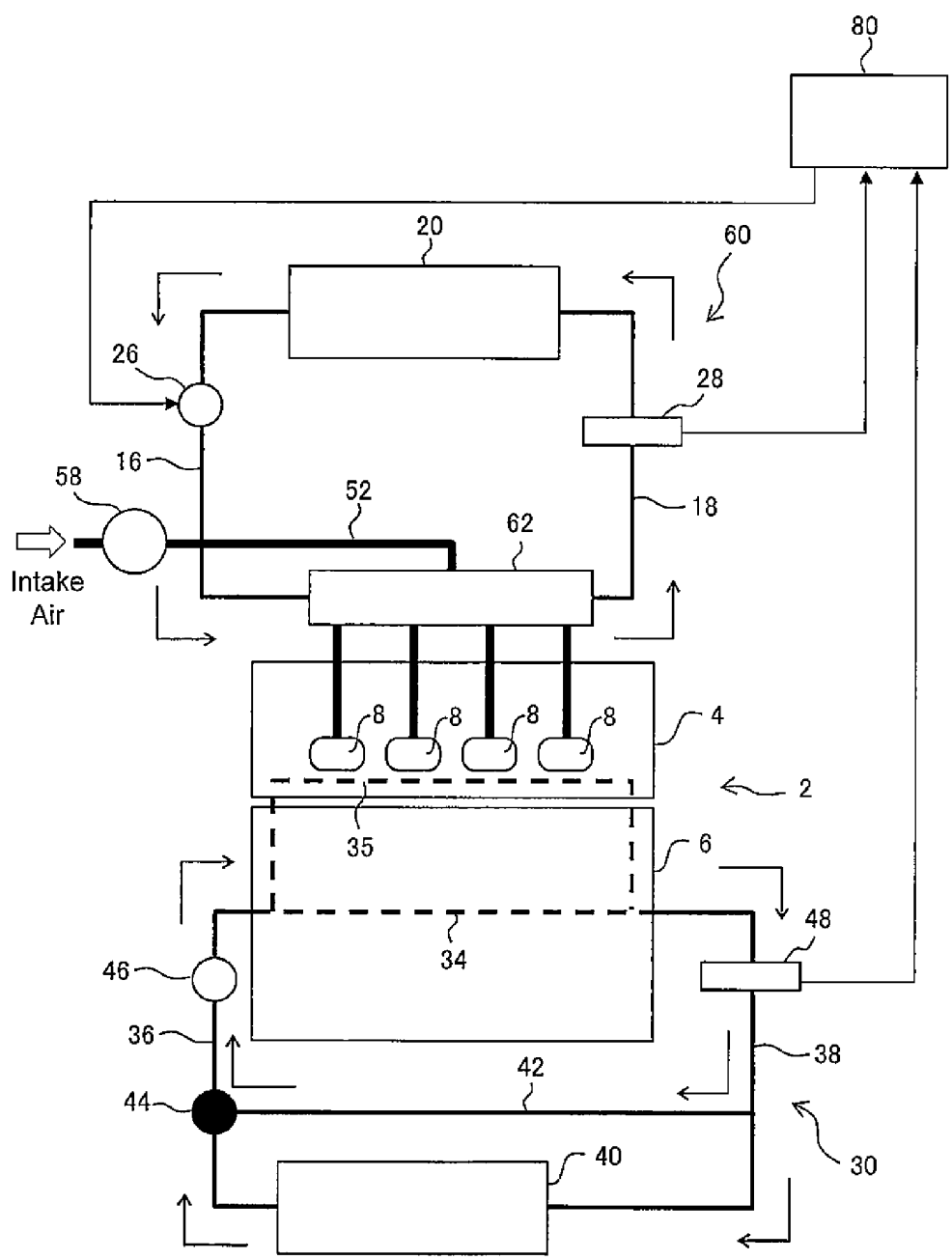

{Fig. 14}
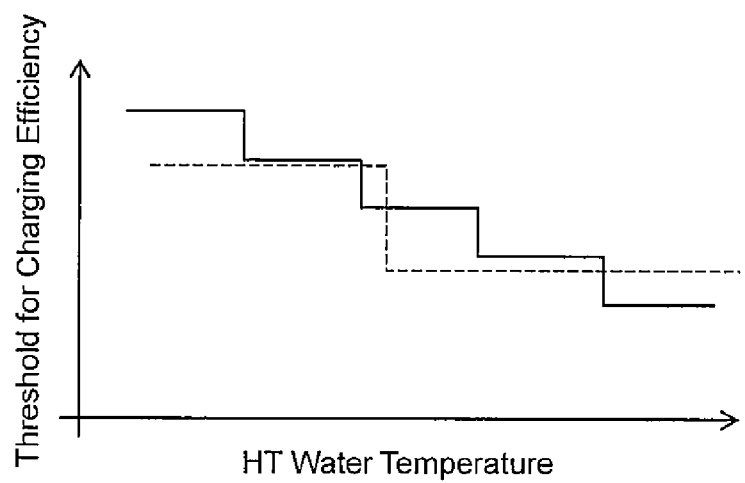
{Fig. 15}
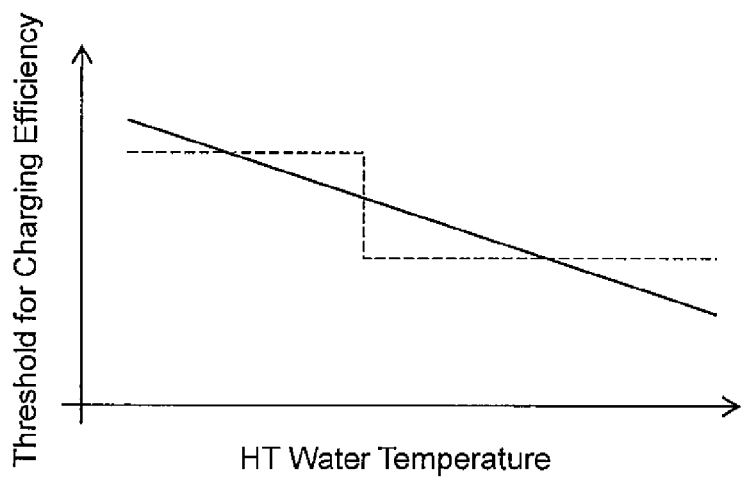

COOLING DEVICE FOR INTERNAL COMBUSTION ENGINE

CROSS-REFERENCE TO RELATED APPLICATION

The present application claims priority to Japanese Patent Application No. 2015-080151 filed on Apr. 9, 2015, which is incorporated herein by reference in its entirety.

TECHNICAL FIELD

Embodiments of the present invention relate to a cooling device for an internal combustion engine, and in particular to a cooling device provided with two cooling water circulating systems.

BACKGROUND ART

An internal combustion engine is provided with a cooling device of a water cooling type to keep a cylinder head and a cylinder block at an appropriate temperature. The cooling device includes a cooling water circulating system that makes a cooling water circulate between a cooling water flow channel formed in the cylinder head and the cylinder block and a radiator. In Japanese Patent Laid-Open No. 2004-084526, a cooling device that controls the temperature of the cooling water according to the load condition of the internal combustion engine is described. According to the technique described in the patent literature, when the internal combustion engine is in a high load condition, the flow rate of the cooling water is increased to reduce the temperature of the cooling water in order to prevent occurrence of knocking.

In Japanese Patent Laid-Open No. 2013-133747 and Japanese Patent Laid-Open No. 2013-133746, cooling devices provided with two cooling water circulating systems are disclosed. One of the cooling water circulating systems is configured to make the cooling water circulate through a cooling water flow channel formed in the cylinder block and a cooling water flow channel formed in the vicinity of the exhaust port of the cylinder head. The other cooling water circulating system is configured to make the cooling water circulate through a cooling water flow channel formed in the vicinity of the intake port of the cylinder head.

SUMMARY

The temperature of the periphery of the intake port has a large effect on the temperature of the intake air, and the temperature of the intake air is highly sensitive to knocking. With the cooling device described in Japanese Patent Laid-Open No. 2013-133747 or the like, the temperature of the cooling water can be adjusted separately in the two cooling water circulating systems, so that the temperature of the cooling water flowing in the periphery of the intake port can be set lower than the temperature of the cooling water flowing in the cylinder block or in the periphery of the exhaust port. Thus, the periphery of the intake port can be effectively cooled to prevent occurrence of knocking.

In the course of devising the invention of this application, the inventors examined a prior cooling device provided with two cooling water circulating systems that controls the temperature of a cooling water flowing in the periphery of the intake port and the like in accordance with the load condition of the internal combustion engine (in the following, this will be referred to as the "prior cooling device"). A cooling water at a lower temperature that flows in the periphery of the intake port and the like is referred to as "low temperature cooling water", and a system that causes circulation of the low temperature cooling water is referred to as "low temperature cooling water circulating system". A cooling water at a higher temperature that flows in the cylinder block and in the periphery of the exhaust port is referred to as "high temperature cooling water", and a system that causes circulation of the high temperature cooling water is referred to as a "high temperature cooling water circulating system".

The high temperature cooling water circulating system is responsible for cooling of the entire internal combustion engine, while the low temperature cooling water circulating system is responsible for cooling of a part that has a particularly large effect on the temperature of the intake air. Therefore, a change of the temperature of the low temperature cooling water has a larger effect on the temperature of the intake air and a smaller effect on the entire internal combustion engine than a change of the temperature of the high temperature cooling water. Therefore, according to the prior cooling device, it was expected that the temperature of the intake air flowing into the combustion chamber could be controlled to an appropriate temperature suitable for the load condition, and knocking could be effectively prevented compared with the technique described in Japanese Patent Laid-Open No. 2004-084526, which is based on the premise of one cooling water circulating system.

However, as a result of intensive study by the inventors of the current application, it has been found that the prior cooling device described above is still susceptible to improvements. According to the prior cooling device, the temperature of the low temperature cooling water is controlled in accordance with the load condition of the internal combustion engine so as to set the temperature of the intake air to be suitable for the load condition. However, the temperature of the low temperature cooling water is not the only factor that causes the temperature of the intake air to change. In the cooling device provided with two cooling water circulating systems, the temperature of the high temperature cooling water used for cooling the entire internal combustion engine also affects the temperature of the intake air. Therefore, depending on the relationship between the temperature of the low temperature cooling water and the temperature of the high temperature cooling water, knocking can occur due to insufficient cooling, or an increase of port wetting or occurrence of unstable combustion can occur due to excessive cooling.

The preferred embodiments have been devised in view of the problems described above, and an object of the preferred embodiments is to provide a cooling device for an internal combustion engine that can prevent occurrence of knocking by cooling intake air and at the same time can prevent an increase of port wetting and occurrence of unstable combustion due to excessive cooling.

A cooling device for an internal combustion engine according to the preferred embodiments comprises a first cooling water flow channel formed in a main unit of the internal combustion engine, intake air cooler of a water cooling type that cools an intake air, two cooling water circulating systems and a controller. Of the two cooling water circulating systems, a first cooling water circulating system is configured to circulate a first cooling water in the first cooling water flow channel, and a second cooling water circulating system is configured to circulate a second cooling water at a lower temperature than the first cooling water through the intake air cooler.

The controller is configured to control operation of the second cooling water circulating system in accordance with a load and an engine speed of the internal combustion engine and a temperature of the first cooling water.

More specifically, the controller is configured to control operation of the second cooling water circulating system so as to set the temperature of the second cooling water lower in a case where an operating point of the internal combustion engine that is defined by the load and the engine speed lies in a particular region of an operational region of the internal combustion engine, the particular region including a region in which the load is high and the engine speed is low, than in a case where the operating point lies outside of the particular region. The temperature of the second cooling water in the particular region can be fixed or set in a distributed manner in accordance with the load or the engine speed, in that the temperature of the second cooling water is lower in the particular region than outside of the particular region. The temperature of the second cooling water outside of the particular region can be fixed or set in a distributed manner in accordance with the load or the engine speed, in that the temperature of the second cooling water is higher in the particular region than outside the particular region.

The controller is further configured to narrow the particular region in a direction toward higher loads in a case where the temperature of the first cooling water is lower than a predetermined temperature compared with a case where the temperature of the first cooling water is higher than the predetermined temperature. The range of the particular region depending on the temperature of the first cooling water can be set in any manner, in that the particular region is narrower in the direction toward higher loads in the case where the temperature of the first cooling water is lower than the predetermined temperature than in the case the temperature of the first cooling water is higher than the predetermined temperature. For example, the particular region may be narrowed stepwise in the direction toward higher loads as the temperature of the first cooling water decreases, and may be widened stepwise in a direction toward lower loads as the temperature of the first cooling water rises. Alternatively, the particular region may be narrowed in the direction toward higher loads as the temperature of the first cooling water decreases, and may be widened in the direction toward lower loads as the temperature of the first cooling water rises.

The cooling device configured as described above can prevent occurrence of knocking by relatively reducing the temperature of the intake air when the internal combustion engine is running in an operational region where the load is high and the engine speed is low in which knocking is likely to occur, and can prevent an increase of port wetting and occurrence of unstable combustion due to excessive cooling by relatively increasing the temperature of the intake air when the internal combustion engine is running in the other operational region. When the temperature of the main unit of the internal combustion engine is relatively low, an increase of port wetting and occurrence of unstable combustion due to excessive cooling can be prevented by limiting the operational region in which the temperature of the intake air is relatively reduced in the direction toward higher loads.

The controller may be configured to narrow the particular region in a direction toward lower engine speeds in the case where the temperature of the first cooling water is lower than the predetermined temperature compared with the case where the temperature of the first cooling water is higher than the predetermined temperature. In this case, an increase of port wetting and occurrence of unstable combustion due to excessive cooling can be prevented with higher reliability.

In this case, the range of the particular region depending on the temperature of the first cooling water can be set in any manner, in that the particular region is narrower in the direction toward lower engine speeds in the case where the temperature of the first cooling water is lower than the predetermined temperature than in the case the temperature of the first cooling water is higher than the predetermined temperature. For example, the particular region may be narrowed stepwise in the direction toward lower engine speeds as the temperature of the first cooling water decreases, and may be widened stepwise in a direction toward higher engine speeds as the temperature of the first cooling water rises. Alternatively, the particular region may be narrowed in the direction toward lower engine speeds as the temperature of the first cooling water decreases, and may be widened in the direction toward higher engine speeds as the temperature of the first cooling water rises.

With the cooling device for an internal combustion engine, the intake air cooler may include a second cooling water flow channel formed in a part of the main unit of the internal combustion engine such that the second cooling water flow channel has a greater effect on the temperature of the intake air than the first cooling water flow channel. The second cooling water at a lower temperature than the first cooling water may flow in the second cooling water flow channel. The second cooling water flow channel may include a flow channel that is formed in a cylinder head and is close to an intake port or a flow channel that is formed in a cylinder block and is close to an upper part of a cylinder on an exhaust side.

If a compressor is provided in an intake channel that is connected to the main unit of the internal combustion engine, the intake air cooler may include a heat exchanger that is provided in the intake channel downstream of the compressor. The second cooling water at a lower temperature than the first cooling water may flow in the heat exchanger. The heat exchanger may be integrated with an intake manifold.

As described above, the cooling device for an internal combustion engine according to the preferred embodiments can prevent occurrence of knocking by cooling the intake air and at the same time can prevent an increase of port wetting and occurrence of unstable combustion due to excessive cooling.

BRIEF DESCRIPTION OF DRAWINGS

FIG. 1 is a diagram showing a configuration of a cooling device according to a first embodiment;

FIG. 2 is a cross sectional view showing a configuration of a cooling water flow channel formed in a cylinder head;

FIG. 3 is a cross sectional view showing a configuration of a cooling water flow channel formed in a cylinder block;

FIG. 4 is a flowchart showing a flow of an LT flow rate control;

FIG. 5 is a diagram showing an example of a relationship between the charging efficiency, the engine speed and the LT target water temperature in the case where the HT water temperature is high;

FIG. 6 is a diagram showing an example of a relationship between the charging efficiency, the engine speed and the LT target water temperature in the case where the HT water temperature is low;

FIG. 7 is a flowchart showing a method of setting the LT target water temperature;

FIG. 8 is a time chart showing an operation of the cooling device in the case where the LT target water temperature is fixed at 40° C.;

FIG. 9 is a time chart showing an operation of the cooling device in the case where the LT target water temperature is fixed at 60° C.;

FIG. 10 is a time chart showing an operation of the cooling device according to the prior cooling device in which the LT target water temperature is changed in accordance with the charging efficiency and the engine speed;

FIG. 11 is a time chart showing an operation of the cooling device according to the first embodiment;

FIG. 12 is a diagram showing a configuration of a cooling device according to a second embodiment;

FIG. 13 is a diagram showing a configuration of a cooling device according to a third embodiment;

FIG. 14 is a diagram showing an example of a threshold for the charging efficiency that separates the low temperature region and the high temperature region of the LT target water temperature set for the HT water temperature; and FIG. 15 is a diagram showing an example of the threshold for the charging efficiency set for the HT water temperature, the threshold separating the low temperature region and the high temperature region of the LT target water temperature.

DESCRIPTION OF EMBODIMENTS

In the following, embodiments will be described with reference to the drawings. Any mention of a numerical value such as the number, quantity, amount or range of an entity in the embodiments described below is not intended to limit the present invention to the numerical value unless otherwise specified or unless it is obvious that the numerical value is determined in principle. In addition, any structure, step or the like described in the embodiments is not essential for the present invention unless otherwise specified or unless it is obvious that the structure, step or the like is determined in principle.

First Embodiment

1. Configuration of Cooling Device

An internal combustion engine according to a first embodiment is a water-cooled engine (referred to simply as an engine, hereinafter) that is cooled by cooling water. The cooling water used to cool the engine is circulated between the engine and a radiator by a cooling water circulating system (a cooling water circulating circuit). The cooling water is supplied to both a cylinder block and a cylinder head forming a main unit of the engine.

FIG. 1 is a diagram showing a configuration of a cooling device according to this embodiment. The cooling device according to this embodiment includes two cooling water circulating systems 10 and 30 that supply cooling water to an engine 2. The cooling water is supplied to both a cylinder block 6 and a cylinder head 4 of the engine 2. The two cooling water circulating systems 10 and 30 are closed loops independently of each other, and cooling water circulated in each of the cooling water circulating systems can be set at different temperatures. In the following, the cooling water circulating system 10, in which cooling water at a lower temperature is circulated, will be referred to as an "LT cooling water circulating system", and the cooling water circulating system 30, in which cooling water at a higher temperature is circulated, will be referred to as an "HT cooling water circulating system". The cooling water circulated in the LT cooling water circulating system 10 will be referred to as "LT cooling water", and the cooling water circulated in the HT cooling water circulating system 30 will be referred to as "HT cooling water". "LT" is an abbreviation of low temperature, and "HT" is an abbreviation of high temperature.

The LT cooling water circulating system 10 includes an in-head LT cooling water flow channel 12 formed in the cylinder head 4 and an in-block LT cooling water flow channel 14 formed in the cylinder block 6. The in-head LT cooling water flow channel 12 is provided in the vicinity of an intake port 8. FIG. 1 shows four intake ports 8 for four cylinders. The in-head LT cooling water flow channel 12 extends in the direction of a crank shaft of the engine 2 along an upper surface of the intake port 8 for each cylinder. The in-block LT cooling water flow channel 14 is provided to surround an upper part of the cylinder, in particular, a part that is likely to be exposed to an intake air flow. The temperatures of the intake port 8, an intake valve and the wall of the upper part of the cylinder greatly influence the occurrence of knocking. Therefore, the occurrence of knocking in a high load region can be effectively prevented by the in-head LT cooling water flow channel 12 and the in-block LT cooling water flow channel 14 intensively cooling these components. The in-head LT cooling water flow channel 12 and the in-block LT cooling water flow channel 14 are connected to each other via openings formed in an interface between the cylinder head 4 and the cylinder block 6.

In the cylinder head 4, a cooling water inlet and a cooling water outlet that are in communication with the in-head LT cooling water flow channel 12 are formed. The cooling water inlet of the cylinder head 4 is connected to a cooling water outlet of an LT radiator 20 by a cooling water inlet pipe 16, and the cooling water outlet of the cylinder head 4 is connected to a cooling water inlet of the LT radiator 20 by a cooling water discharge pipe 18. The cooling water inlet pipe 16 and the cooling water discharge pipe 18 are connected to each other by a bypass pipe 22 that bypasses the LT radiator 20. A three way valve 24 is provided at a branch point at which the bypass pipe 22 branches from the cooling water discharge pipe 18. An electric water pump 26 that causes circulation of the LT cooling water is provided on the cooling water inlet pipe 16 at a point downstream of a merging point at which the bypass pipe 22 merges with the cooling water inlet pipe 16. The discharge volume of the electric water pump 26 can be arbitrarily changed by adjusting the power of a motor thereof. A temperature sensor 28 that measures the temperature of the LT cooling water having passed through the engine 2 (outlet cooling water temperature) is attached to the cooling water discharge pipe 18 at a point upstream of the three way valve 24. In this embodiment, the temperature of the LT cooling water means the outlet cooling water temperature measured by the temperature sensor 28.

The HT cooling water circulating system 30 includes an in-block HT cooling water flow channel 34 formed in the cylinder block 6 and an in-head HT cooling water flow channel 35 formed in the cylinder head 4. The in-block HT cooling water flow channel 34 forms a main part of a water jacket that surrounds the periphery of the cylinder, whereas the in-block LT cooling water flow channel 14 described above is locally provided. The in-head HT cooling water flow channel 35 is provided to extend from the vicinity of an exhaust port to the vicinity of the intake ports. The intake air flowing through the intake port 8 is first cooled by the HT cooling water flowing through the in-head HT cooling water flow channel 35 and then cooled by the LT cooling water, which is at a lower temperature than the HT cooling water, flowing through the in-head LT cooling water flow channel 12. The in-head HT cooling water flow channel 35 and the in-block HT cooling water flow channel 34 are connected to each other via openings formed in the interface between the cylinder head 4 and the cylinder block 6.

In the cylinder block 6, a cooling water inlet and a cooling water outlet that are in communication with the in-block HT cooling water flow channel 34 are formed. The cooling water inlet of the cylinder block 6 is connected to a cooling water outlet of an HT radiator 40 by a cooling water inlet pipe 36, and the cooling water outlet of the cylinder block 6 is connected to a cooling water inlet of the HT radiator 40 by a cooling water discharge pipe 38. The cooling water inlet pipe 36 and the cooling water discharge pipe 38 are connected to each other by a bypass pipe 42 that bypasses the HT radiator 40. A thermostat 44 is provided on the cooling water inlet pipe 36 at a merging point at which the bypass pipe 42 merges with the cooling water inlet pipe 36. A mechanical water pump 46 that causes circulation of the HT cooling water is provided on the cooling water inlet pipe 36 at a point downstream of the thermostat 44. The water pump 46 is operatively coupled to the crank shaft of the engine 2, for example, by a belt. A temperature sensor 48 that measures the temperature of the HT cooling water having passed through the engine 2 (outlet cooling water temperature) is attached to the cooling water discharge pipe 38 at a point upstream of a branch point at which the bypass pipe 42 branches from the cooling water discharge pipe 38. In this embodiment, the temperature of the HT cooling water means the outlet cooling water temperature measured by the temperature sensor 48.

As described above, in the HT cooling water circulating system 30, the water pump 46 is driven by the engine 2, so that the HT cooling water is constantly circulated during operation of the engine 2. The temperature of the cooling water circulated in the HT cooling water circulating system 30 is automatically adjusted by the thermostat 44. On the other hand, in the LT cooling water circulating system 10, the electric water pump 26 is used, so that circulation of the LT cooling water can be started and stopped whether the engine 2 is running or not. In addition, the flow rate of the circulated LT cooling water can be controlled by adjusting the drive duty cycle of the electric water pump 26. In addition, the temperature of the LT cooling water circulated in the LT cooling water circulating system 10 can be actively adjusted through operation of the three way valve 24 or the electric water pump 26.

The three way valve 24 and the electric water pump 26 of the LT cooling water circulating system 10 operate under the control of a controller 80. The controller 80 doubles as a controller for the cooling device and a controller that controls operation of the engine 2. The controller 80 primarily comprises an electronic control unit (ECU) that includes one or more CPUs and one or more memories. The controller 80 adjusts the temperature of the LT cooling water flowing through the in-head LT cooling water flow channel 12 and the in-block LT cooling water flow channel 14 to an appropriate temperature by making the electric water pump 26 operate to adjust the flow rate of the LT cooling water (referred to as an LT flow rate, hereinafter) and by making the three way valve 24 operate to adjust the proportion of the LT cooling water that bypasses the LT radiator 20.

The cooling device configured as described above corresponds to an embodiment of the present invention set forth in the claims as follows. That is, the HT cooling water circulating system 30 corresponds to a first cooling water circulating system, the in-block HT cooling water flow channel 34 and the in-head HT cooling water flow channel 35 correspond to a first cooling water flow channel, and the HT cooling water corresponds to first cooling water. In addition, the LT cooling water circulating system 10 corresponds to a second cooling water circulating system, the in-head LT cooling water flow channel 12 and the in-block LT cooling water flow channel 14 corresponds to a second cooling water flow channel and to intake air cooling means, and the LT cooling water corresponds to second cooling water.

2. Configuration of Cooling Water Flow Channel Formed in Cylinder Head

As shown in FIG. 1, in the cylinder head 4, the in-head LT cooling water flow channel 12 in which the LT cooling water, which is at a lower temperature, flows and the in-head HT cooling water flow channel 35 in which the HT cooling water, which is at a higher temperature, flows are formed. In the following, a configuration of the cooling water flow channels will be specifically described with reference to a cross sectional view of the cylinder head 4.

FIG. 2 is a cross sectional view showing a cross section of the cylinder head 4 that is taken perpendicular to a longitudinal direction thereof (i.e., along the length of the crank shaft) and includes a central axis of an intake valve insertion hole 107. In FIG. 2, the cylinder head 4 is shown as being provided with only an intake valve 11, and illustration of an exhaust valve is omitted. A combustion chamber 104 having a pent roof-like shape is formed in a cylinder block mating surface 4a, which is a lower surface of the cylinder head 4.

Viewed from the side of a front end of the cylinder head 4, the intake port 8 opens in a right inclined surface of the combustion chamber 104. The "side of the front end of the cylinder head 4" means one of the ends of the cylinder head 4 in the longitudinal direction that is opposite to the output end of the crank shaft. A connection between the intake port 8 and the combustion chamber 104, that is, an open end of the intake port 8 on the side of the combustion chamber is an inlet that is opened and closed by an intake valve 111. Two intake valves 111 are provided for each cylinder, so that two inlets for the intake port 8 are formed in the combustion chamber 104. The intake port 8 extends substantially straight from an entry formed in a side surface of the cylinder head 4 toward the combustion chamber 104 and then is divided at a midpoint into two branch ports, each of which opens into the combustion chamber 104 to form an inlet. FIG. 2 shows a branch port 8L located to the side of the front end of the engine in the longitudinal direction. The intake port 8 is a tumble flow generating port capable of generating a tumble flow in the cylinder.

Viewed from the side of the front end of the cylinder head 4, an exhaust port 103 opens in a left inclined surface of the combustion chamber 104. A connection between the exhaust port 103 and the combustion chamber 104, that is, an open end of the exhaust port 103 on the side of the combustion chamber is an outlet that is opened and closed by an exhaust valve (not shown).

In the cross section shown in FIG. 2, regions denoted by reference numerals 35a, 35b, 35c, 35d and 35e are cross sections of parts of the in-head HT cooling water flow channel 35 shown in FIG. 1. In the following, for example, the region denoted by the reference numeral 35a will be referred to as a part 35a of the in-head HT cooling water flow channel or an in-head HT cooling water flow channel 35a. Although the parts 35a, 35b, 35c, 35d and 35e of the in-head HT cooling water flow channel are shown as separate parts in the cross section shown in FIG. 2, the parts are continuous in the cylinder head 4.

In the cross section shown in FIG. 2, the part 35a of the in-head HT cooling water flow channel is disposed in a region close to an apex of the pent roof of the combustion chamber 104 between an upper surface 103a of the exhaust port 103 that is close to the outlet and an upper surface 8a of the intake port 8 that is close to the inlet. The part 35b of the in-head HT cooling water flow channel is disposed between a lower surface 103b of the exhaust port 103 and the cylinder block mating surface 4a. The part 35b of the in-head HT cooling water flow channel opens in the cylinder block mating surface 4a and is in communication with the in-block HT cooling water flow channel. The parts 35d and 35e of the in-head HT cooling water flow channel are disposed on the opposite sides of a central axis of an exhaust valve insertion hole 108. The parts 35a, 35b, 35d and 35e of the in-head HT cooling water flow channel form a water jacket that surrounds the periphery of the exhaust port 103 to cool the exhaust port 103 and the exhaust valve. The part 35a of the in-head HT cooling water flow channel is to cool the periphery of the combustion chamber 104 that can become hot.

In the cross section shown in FIG. 2, the part 35c of the in-head HT cooling water flow channel is disposed between a lower surface 8b of the intake port 8 and the cylinder block mating surface 4a. The part 35c of the in-head HT cooling water flow channel is located close to the branch point in the intake port 8 and opens in the cylinder block mating surface 4a. At the opening, the part 35c is in communication with the in-block HT cooling water flow channel. The HT cooling water having flowed through the cylinder block is introduced into the part 35c of the in-head HT cooling water flow channel through the opening in the cylinder block mating surface 4a.

In the cross section shown in FIG. 2, regions denoted by reference numerals 12a and 12b are cross sections of parts of the in-head LT cooling water flow channel 12 shown in FIG. 1. The in-head LT cooling water flow channel extends in the longitudinal direction of the cylinder head 4 along the upper surface 8a of the intake port 8 of each cylinder. The region denoted by the reference numeral 12a is a flow channel that passes through a region that is closer to the outer periphery of the cylinder head 4 than the intake valve insertion hole 107, and will be referred to as an outer flow channel 12a of the in-head LT cooling water flow channel hereinafter. The region denoted by the reference numeral 12b is a flow channel that passes through a region that is closer to the center of the cylinder head 4 than the intake valve insertion hole 107, and will be referred to as an inner flow channel 12b of the in-head LT cooling water flow channel hereinafter. Although the inner flow channel 12b and the outer flow channel 12a of the in-head LT cooling water flow channel are shown as separate flow channels in the cross section shown in FIG. 2, the inner flow channel 12b and the outer flow channel 12a are connected to each other at a plurality of points in the cylinder head 4 along the longitudinal direction.

In the cross section shown in FIG. 2, the inner flow channel 12b of the in-head LT cooling water flow channel is located on the opposite side of the part 35a of the in-head HT cooling water flow channel to the apex of the pent roof of the combustion chamber 104 and disposed close to the wall of the intake valve insertion hole 107. The outer flow channel 12a is located close to the branch point in the intake port 8 upstream of the intake valve insertion hole 107. The outer flow channel 12a is disposed close to both the wall of the intake valve insertion hole 107 and the upper surface 8a of the intake port 8.

With the configuration shown in FIG. 2 described above, the upper surface 8a of the intake port 8, in particular, the part of the upper surface 8a upstream of the intake valve insertion hole 107 can be effectively cooled by the LT cooling water that flows in the outer flow channel 12a and the inner flow channel 12b of the in-head LT cooling water flow channel and that is at a lower temperature than the HT cooling water that flows in the in-head HT cooling water flow channel and cools the exhaust port 103. In the intake port 8, which is a tumble flow generating port, the intake air flows along the upper surface 8a of the intake port 8. Therefore, the intake air flowing in the intake port 8 can be effectively cooled by cooling the upper surface 8a of the intake port 8 with the LT cooling water, which is at a lower temperature.

The part 35a of the in-head HT cooling water flow channel is located between the apex of the pent roof of the combustion chamber 104 and the inner flow channel 12b of the in-head LT cooling water flow channel. Heat from the combustion chamber 104 is absorbed by HT cooling water flowing in the part 35a of the in-head HT cooling water flow channel and therefore is prevented from being directly transferred to the inner flow channel 12b. Therefore, the LT cooling water in the inner flow channel 12b is prevented from being heated by the heat from the combustion chamber 104, and therefore, deterioration of the cooling efficiency of the air flowing in the intake port 8 is prevented.

Heat transfer from the cylinder block mating surface 4a to the lower surface 8b of the intake port can be reduced by the part 35c of the in-head HT cooling water flow channel. Since the temperature of the HT cooling water that cools the part of the intake port 8 on the side of the lower surface 8b is higher than the temperature of the LT cooling water that cools the part of the intake port 8 on the side of the upper surface 8a, the temperature of the lower surface 8b of the intake port 8, to which more fuel injected from a port injector (not shown) adheres, is prevented from being excessively lowered. That is, the part 35c of the in-head HT cooling water flow channel ensures that the lower surface 8b of the intake port 8 can be appropriately cooled without interfering with evaporation of the fuel.

3. Configuration of Cooling Water Flow Channel Formed in Cylinder Block

As shown in FIG. 1, in the cylinder block 6, the in-block LT cooling water flow channel 14 in which the LT cooling water at a lower temperature flows and the in-block HT cooling water flow channel 34 in which the HT cooling water at a higher temperature flows are formed. In the following, a configuration of these cooling water flow channels will be specifically described with reference to a cross sectional view of the cylinder block 6.

FIG. 3 is a cross sectional view showing one of cross sections of the cylinder block 6 that are perpendicular to the longitudinal direction viewed from the side of the front end of the cylinder block 6, the cross section including the intake port 8 of the cylinder head 4 assembled onto the cylinder block 6. In FIG. 3, the alternate long and two short dashed lines indicate the cylinder head 4 and a piston 122. Since the intake port 8 formed in the cylinder head 4 is a tumble flow generating port that extends substantially straight toward the combustion chamber 104, a tumble flow is generated in the combustion chamber 104. In FIG. 3, an illustration of a tumble flow 124 is shown by an arrow.

In this embodiment, a positional relationship between the components will be described on the assumption that the cylinder head 4 is positioned vertically above the cylinder block 6. This assumption is for illustrative purposes only and does not limit the configuration of the cylinder block according to embodiments of the present disclosure in any way.

In the cross section shown in FIG. 3, an intake-side water jacket 34a is formed on the intake side of a cylinder 120. The intake-side water jacket 34a is provided to cover a wall 120a of the cylinder 120 on the intake side. An upper end of the intake-side water jacket 34a is an open end that opens in the cylinder head mating surface 6a. Except for a part that forms a communicating hole to the in-head HT cooling water flow channel, the open end is closed by a gasket when the cylinder head 4 is assembled onto the cylinder block 6.

An exhaust-side water jacket 14a is formed on the exhaust side of the cylinder 120. The exhaust-side water jacket 14a is provided to cover an upper wall 120b of the cylinder 120 on the exhaust side. An upper end of the exhaust-side water jacket 14a is an open end that opens in the cylinder head mating surface 6a. Except for a part that forms a communicating hole to the in-head LT cooling water flow channel, the open end is closed by a gasket when the cylinder head 4 is assembled onto the cylinder block 6.

The depth of the exhaust-side water jacket 14a from the cylinder head mating surface 6a in the axial direction of the cylinder 120 is smaller than the depth of the intake-side water jacket 34a. More specifically, in the axial direction of the cylinder 120, the exhaust-side water jacket 14a lies from the position of the upper surface of the piston 122 at the time of the maximum lift of the intake valve to the region of the cylinder head mating surface 6a of the cylinder block 6. When the intake valve opens to the maximum lift, the flow rate of the intake air introduced into the combustion chamber 104 through the intake port 8 is at the maximum. The intake air flows along the upper surface of the intake port 8 into the combustion chamber 104 and hits the wall 120b of the cylinder 120 on the exhaust side to vertically swirl to form the tumble flow 124. The exhaust-side water jacket 14a is provided to cool the wall 120b that is to be hit by the tumble flow 124.

A second exhaust-side water jacket 34b is further formed on the exhaust side of the cylinder 120. The second exhaust-side water jacket 34b is provided below the exhaust-side water jacket 14a to cover a lower wall 120c of the cylinder 120 on the exhaust side. Although not shown, viewed from the side of the cylinder head mating surface 6a in the axial direction of the cylinder 120, the second exhaust-side water jacket 34b has substantially the same shape as the exhaust-side water jacket 14a. The position of a lower end (bottom) of the second exhaust-side water jacket 34b with respect to the cylinder head mating surface 6a is substantially the same as the position of a lower end of the intake-side water jacket 34a with respect to the cylinder head mating surface 6a.

The intake-side water jacket 34a and the second exhaust-side water jacket 34b are connected to each other in the cylinder block 6 and form a part of the in-block HT cooling water flow channel 34 shown in FIG. 1. On the other hand, the exhaust-side water jacket 14a forms a part of the in-block LT cooling water flow channel 14 shown in FIG. 1. Therefore, the LT cooling water that is at a lower temperature than the HT cooling water flowing in the intake-side water jacket 34a and the like flows in the exhaust-side water jacket 14a. Thus, with the configuration described above, heat transfer from the wall 120b of the cylinder 120 to the intake air introduced through the intake port 8 can be efficiently prevented. In addition, since the cooling water at the lower temperature flows only in the in-block LT cooling water flow channel including the exhaust-side water jacket 14a, excessive cooling can be prevented, thereby preventing an increase of friction of slidable parts of the engine and an increase of the cooling loss.

4. LT Flow Rate Control

The controller 80 controls the LT flow rate to cool essential parts of the cylinder head 4 and the cylinder block 6 to an appropriate temperature. FIG. 4 is a flowchart showing a flow of an LT flow rate control performed by the controller 80. The controller 80 repeatedly performs the routine shown by the flow at a predetermined control period that, for example, may corresponds to the number of clocks of the ECU.

The controller 80 first sets an LT target water temperature, which is a target temperature of the LT cooling water flowing in the in-head LT cooling water flow channel 12 and the in-block LT cooling water flow channel 14 (step S2). A method of setting the LT target water temperature will be described in detail in the following section.

The controller 80 then calculates an LT required flow rate, which is a required value of the LT flow rate, from the LT target water temperature determined in step S2 (step S4). More specifically, the controller 80 calculates a feed-forward term of the LT required flow rate by referring to a previously prepared map that associates the LT target water temperature and the LT required flow rate, and calculates a feedback term of the LT required flow rate based on the difference between the LT target water temperature and a current temperature (outlet temperature) of the LT cooling water measured by the temperature sensor 28.

The controller 80 then determines the drive duty cycle of the electric water pump 26 from the LT required flow rate determined in step S4 (step S6). If a valve that adjusts the LT flow rate is provided in the LT cooling water circulating system 10, the LT flow rate can also be adjusted by adjusting the opening of the valve.

The controller 80 finally makes the electric water pump 26 operate with the drive duty cycle determined in step S6 to pump the cooling water through the in-head LT cooling water flow channel 12 and the in-block LT cooling water flow channel 14 (step S8). As a result, the LT flow rate changes, and essential parts of the cylinder head 4 and the cylinder block 6 are cooled to an appropriate temperature.

5. Setting of LT Target Water Temperature

The controller 80 determines, as the LT target water temperature, the temperature of the LT cooling water that is effective for preventing occurrence of knocking. In a map stored in a ROM of the controller 80, the LT target water temperature is associated with the operational state of the engine 2 that is specified by the engine speed, the charging efficiency (which is used in this embodiment as a specific parameter of whether the engine load is high or low) and the temperature of the HT cooling water (referred to as an HT water temperature, hereinafter). The map used to set the LT target water temperature is substantially a set of two kinds of maps that associate the LT target water temperature with the engine speed and the charging efficiency.

The two kinds of maps are selectively used depending on the HT water temperature. If the HT water temperature is a high temperature, which is higher than a predetermined temperature (90° C., for example), the controller 80 determines the LT target water temperature according to the map shown in FIG. 5. If the HT water temperature is a low temperature, which is lower than the predetermined temperature, the controller 80 determines the LT target water temperature according to the map shown in FIG. 6. In the following, the map shown in FIG. 5 will be referred to as an HT high temperature map, and the map shown in FIG. 6 will be referred to as an HT low temperature map.

In both the HT high temperature map and the HT low temperature map, a low water temperature region and a high water temperature region are set. The low water temperature region is set in an operational region in which the charging efficiency is high and the engine speed is low. In the example shown in FIGS. 5 and 6, an operational region in which the charging efficiency is higher than a certain value and the engine speed is lower than a certain value is specified as the low water temperature region. If the operating point of the engine 2 defined by the charging efficiency and the engine speed lies in the low water temperature region, the LT target water temperature is set at a predetermined low temperature (40° C. in this example). Although the LT target water temperature in the low water temperature region is not limited to the 40° C. shown as an example, temperatures close to 40° C. are suitable for preventing occurrence of knocking. In the correspondence with embodiments of the present invention set forth in the claims, the low water temperature region corresponds to a specific region.

The high water temperature region is set in the operational region other than the region in which the low water temperature region is set. In the example shown in FIGS. 5 and 6, an operational region in which the charging efficiency is lower than the certain value or the engine speed is higher than the certain value is specified as the high water temperature region. If the operating point of the engine 2 lies in the high water temperature region, the LT target water temperature is set at a predetermined high temperature (60° C. in this example). Although the LT target water temperature in the high water temperature region is not limited to the 60° C. shown as an example, if the LT target water temperature is set at a temperature close to 60° C., an increase of port wetting and occurrence of unstable combustion due to excessive cooling can be prevented in a low charging efficiency region or a high engine speed region in which the temperature around the intake port tends to decrease.

The HT high temperature map shown in FIG. 5 and the HT low temperature map shown in FIG. 6 differ in the range of the operational region in which the low water temperature region is set. The low water temperature region in the HT low temperature map is narrowed in the direction toward higher charging efficiencies and toward lower engine speeds, compared with the low water temperature region in the HT high temperature map. The operational region that switches from the low water temperature region to the high water temperature region when the map is switched (the operational region shown by the dotted line in FIG. 6) is an operational region in which the likelihood of knocking, port wetting, or other undesirable effects changes depending on the relationship between the HT water temperature and the LT water temperature. The operational region that is specified as the low water temperature region in both the maps (the operational region specified as the low water temperature region in the HT low temperature map) is an operational region in which knocking tends to occur as the temperature of the intake air rises regardless of whether the HT water temperature is high or low, so that the LT target water temperature is constantly set at 40° C., which is the lower temperature, in the operational region. On the other hand, the operational region that is specified as the high water temperature region in both the maps (the operational region specified as the high water temperature region in the HT high temperature map) is an operational region in which port wetting tends to increase or combustion tends to be destabilized as the temperature of the intake air decreases regardless of whether the HT water temperature is high or low, so that the LT target water temperature is constantly set at 60° C., which is the higher temperature, in the operational region.

In the operational region that switches from the low water temperature region to the high water temperature region when the map is switched, the LT target water temperature is set at 40° C. if the HT water temperature is lower than the predetermined temperature described above and set at 60° C. when the HT water temperature becomes higher than the predetermined temperature. By switching the LT target water temperature from the lower temperature to the higher temperature depending on whether the HT water temperature is higher than the predetermined temperature in this way, both an increase of port wetting and occurrence of unstable combustion due to excessive cooling and occurrence of knocking due to insufficient cooling can be prevented.

The controller 80 implements the method of setting the LT target water temperature described above by calling a subroutine in the LT flow rate control routine. FIG. 7 is a flowchart showing a flow of setting the LT target water temperature. The controller 80 repeatedly performs the subroutine shown by this or similar flow, for example, at the same control period as the LT flow rate control routine.

The controller 80 first determines whether or not a water temperature feedback control (water temperature FB) is permitted in the LT cooling water circulating system 10 (step S102). If the engine 2 is in the warm-up phase or if a sensor essential for the water temperature feedback control fails, for example, the water temperature feedback control is not permitted. Examples of specific conditions for permission of the water temperature feedback control include that the HT water temperature is equal to or higher than 70° C., that the LT water temperature is equal to or higher than 30° C., and that a flag that is set when the sensor fails is in the off state. If any of these conditions is not satisfied, the process proceeds to step S108.

If the result of the determination in step S102 is positive, the controller 80 then determines whether or not the vehicle is running (step S104). This determination is made because a different LT target water temperature has to be set regardless of the charging efficiency during idling of the engine. This determination can be made based on the shift position of an automatic transmission if the engine 2 is combined with such an automatic transmission, for example. If the shift position is not in the P range or N range, it can be estimated that the vehicle is running. Alternatively, if an external device that mechanically or electronically detects that the vehicle is running is mounted on the vehicle, whether the vehicle is running or not can be determined based on a signal from the device. If the vehicle is running, the process proceeds to step S106. If the vehicle is not running, the process proceeds to step S108.

If the water temperature feedback control in the LT cooling water circulating system 10 is permitted, and the vehicle is running and the LT cooling water can be sufficiently cooled by the radiator 20, the controller 80 sets the LT target water temperature in the processing of step S106. On the other hand, if the water temperature feedback control is not permitted, or if the vehicle is not running, the controller 80 sets the LT target water temperature according to the condition of the engine 2 (step S108).

In step S108, the controller 80 sets the LT target water temperature according to the result of the determination in step S102 or S104. For example, if the result of the determination in step S102 is negative because the engine 2 is in the warm-up phase, the controller 80 sets the LT target water temperature at 50° C., which is an intermediate temperature. If the result of the determination in step S102 is negative because the temperature sensor 48 that measures the HT water temperature fails, the controller 80 sets the LT target water temperature at 40° C., which is the lower temperature. If the result of the determination in step S104 is negative because the engine 2 is idling, the controller 80 sets the LT target water temperature at 60° C., which is the higher temperature.

In step S106, the controller 80 chooses the HT high temperature map if the HT water temperature becomes higher than the predetermined temperature, and chooses the HT low temperature map if the HT water temperature becomes lower than the predetermined temperature, as described above with reference to FIGS. 5 and 6. Using the chosen map, the LT target water temperature that is suitable for the current charging efficiency (KL) and the current engine speed (Ne) is set. The LT target water temperature set in step S106 or S108 is read by the LT flow rate control routine, which is a main routine, and the LT flow rate control is performed based on the LT target water temperature.

6. Operation of Cooling Device

Next, an operation of the cooling device implemented by the controller 80 will be described with reference to comparative examples and time charts of FIGS. 8 to 11. Each drawing shows temporal variations of a plurality of state quantities relating to the operation of the cooling device. In each drawing, the first chart from the top indicates the engine speed (Ne), the second chart from the top indicates the charging efficiency (KL), and the third chart from the top indicates the opening of the accelerator pedal. In each drawing, the fourth chart from the top indicates the HT water temperature, the fifth chart from the top indicates the LT water temperature, and the sixth chart from the top indicates the LT target water temperature. Furthermore, in each drawing, the seventh chart from the top indicates occurrence of knocking detected by a knocking sensor, and the eighth chart from the top indicates occurrence of port wetting or occurrence of unstable combustion.

6-1. Operation in First Comparative Example

FIG. 8 is a time chart showing an operation in a first comparative example. In the first comparative example, the LT flow rate control routine is performed with the LT target water temperature fixed at 40° C.

In the time chart shown in FIG. 8, the LT target water temperature is constantly fixed at 40° C., which is the lower temperature. Therefore, once the engine 2 is started, the LT water temperature rises to 40° C. and is then kept at 40° C. regardless of the charging efficiency and the engine speed of the engine 2 and the HT water temperature. As a result, occurrence of knocking due to the HT water temperature being high and the charging efficiency being high is prevented. However, an increase of port wetting and occurrence of unstable combustion due to the HT water temperature is not sufficiently raised are not satisfactorily prevented.

As shown by the dotted line in the eighth chart from the top, an increase of port wetting and occurrence of unstable combustion can occur during the warm-up phase immediately after start of the engine 2. However, this problem is already addressed by a warm-up control based on control parameters other than the LT water temperature, such as the ignition timing, the fuel injection amount or the fuel injection timing. A similar measure is taken in the second and third comparative example described later in this embodiment.

6-2. Operation in Second Comparative Example

FIG. 9 is a time chart showing an operation in a second comparative example. In the second comparative example, the LT flow rate control routine is performed with the LT target water temperature fixed at 60° C.

In the time chart shown in FIG. 9, the LT target water temperature is constantly fixed at 60° C., which is the higher temperature. Therefore, once the engine 2 is started, the LT water temperature rises to 60° C. and is then kept at 60° C. regardless of the charging efficiency and the engine speed of the engine 2 and the HT water temperature. As a result, an increase of port wetting and occurrence of unstable combustion under the condition that the HT water temperature is not sufficiently raised are prevented. However, occurrence of knocking due to the HT water temperature is high and the charging efficiency is high is not satisfactorily prevented.

6-3. Operation in Third Comparative Example

FIG. 10 is a time chart showing an operation in a third comparative example. In the third comparative example, although the LT target water temperature is set according to the charging efficiency and the engine speed, the HT water temperature is not taken into consideration. That is, FIG. 10 shows an operation according to the prior cooling device described earlier.

In the time chart shown in FIG. 10, regardless of the HT water temperature, if the charging efficiency becomes higher than a threshold KLT, the LT target water temperature is set at 60° C., which is the higher temperature, and if the charging efficiency becomes lower than the threshold KLT, the LT target water temperature is set at 40° C., which is the lower temperature. With such a setting, the LT water temperature can be reduced if knocking becomes likely to occur as the charging efficiency increases, and the LT water temperature can be increased if knocking becomes unlikely to occur as the charging efficiency decreases. However, since the HT water temperature is not taken into consideration, an increase of port wetting and occurrence of unstable combustion are not satisfactorily prevented if the LT water temperature is reduced in response to the charging efficiency exceeding the threshold KLT when the HT water temperature is not sufficiently raised.

6-4. Operation of Cooling Device According to First Embodiment

FIG. 11 is a time chart showing an operation of the cooling device according to the present embodiment. The second chart from the top shows two thresholds KLTL and KLTH. The threshold KLTL is a value of the charging efficiency that is a boundary between the low temperature region and the high temperature region in the HT low temperature map. The threshold KLTH is a value of the charging efficiency that is a boundary between the low temperature region and the high temperature region in the HT high temperature map. Therefore, the threshold KLTL is greater than the threshold KLTH.

In the time chart shown in FIG. 11, while the HT water temperature is low, the threshold KLTL is set for the charging efficiency, and after the HT water temperature is raised, the threshold for the charging efficiency is reduced from the threshold KLTL to the threshold KLTH. If the threshold for the charging efficiency is changed depending on the HT water temperature in this way, the LT target water temperature is maintained at 60° C. when the HT water temperature is not sufficiently raised, as shown in an ellipse in the drawing. As a result, the LT water temperature is prevented from decreasing below the condition where the HT water temperature is low, so that the increase of port wetting and the occurrence of unstable combustion that are not satisfactorily prevented in the third comparative example (i.e., of the prior cooling device) can be prevented.

As can be seen from the operation shown in this time chart, the cooling device according to the first embodiment can prevent occurrence of knocking by cooling the intake air and at the same time can prevent an increase of port wetting and occurrence of unstable combustion due to excessive cooling.

Second Embodiment

FIG. 12 is a diagram showing a configuration of a cooling device according to a second embodiment. In FIG. 12, the same components as those of the cooling device according to the first embodiment shown in FIG. 1 are denoted by the same reference numerals.

The engine 2 in which the cooling device according to this embodiment is used is a turbocharged engine. A turbo compressor 58 is attached to an intake channel 52, and a water cooling intercooler (i.e., a heat exchanger) 56 is attached downstream of the turbo compressor 58. The intake channel 52 downstream of the water cooling intercooler 56 has an intake manifold 54 that distributes the intake air among the intake ports 8.

The cooling device according to this embodiment is provided with two cooling water circulating systems 50 and 30. One cooling water circulating system 30 is an HT cooling water circulating system in which HT cooling water is circulated. The HT cooling water circulating system 30 is the same as that in the first embodiment, and description thereof will be omitted. The other cooling water circulating system 50 is an LT cooling water circulating system in which LT cooling water, which is at a lower temperature than the HT cooling water, is circulated. The cooling device according to the second embodiment differs from the cooling device according to the first embodiment in the configuration of the LT cooling water circulating system 50.

In the cooling device according to this embodiment, the water cooling intercooler 56 is incorporated in the LT cooling water circulating system 50, and the LT cooling water that has the lower temperature and is circulated in the LT cooling water circulating system 50 is used for heat exchange with the intake air in the water cooling intercooler 56. The water cooling intercooler 56 is disposed downstream of the electric water pump 26 on the cooling water inlet pipe 16. The LT cooling water used for heat exchange with the intake air in the water cooling intercooler 56 is introduced into the in-head LT cooling water flow channel 12 formed in the cylinder head 4 and the in-block LT cooling water flow channel 14 to cool the periphery of the intake ports 8 and the upper part of the cylinder, thereby cooling again the intake air once cooled in the water cooling intercooler 56.

The cooling device configured as described above and the present invention set forth in the claims correspond to each other as follows. That is, the LT cooling water circulating system 50 corresponds to a second cooling water circulating system, and the water cooling intercooler 56 corresponds to intake air cooling means. In addition, the in-head LT cooling water flow channel 12 and the in-block LT cooling water flow channel 14 also correspond to the intake air cooling means.

In this embodiment, the LT target water temperature is set for the LT cooling water circulated in the LT cooling water circulating system 50, and the LT flow rate is controlled to bring the temperature of the LT cooling water (outlet temperature measured by the temperature sensor 28) to the LT target water temperature. The LT target water temperature is set according to the engine load, the engine speed and the HT water temperature. The method of setting the LT target water temperature according to this embodiment is the same as that in the first embodiment, and description thereof will be omitted.

Third Embodiment

FIG. 13 is a diagram showing a configuration of a cooling device according to a third embodiment. In FIG. 13, the same components as those of the cooling device according to the first embodiment shown in FIG. 1 are denoted by the same reference numerals.

The engine 2 in which the cooling device according to this embodiment is used is a turbocharged engine. A turbo compressor 58 is attached to an intake channel 52, and a water cooling intercooler (heat exchanger) 62 integrated with an intake manifold is attached downstream of the turbo compressor 58. The integrated intake manifold distributes the intake air cooled by the water cooling intercooler 62 among the intake ports 8 for the cylinders.

The cooling device according to this embodiment is provided with two cooling water circulating systems 60 and 30. One cooling water circulating system 30 is an HT cooling water circulating system in which HT cooling water is circulated. The HT cooling water circulating system 30 is the same as that in the first embodiment, and description thereof will be omitted. The other cooling water circulating system 60 is an LT cooling water circulating system in which LT cooling water, which is at a lower temperature than the HT cooling water, is circulated. The cooling device according to the third embodiment differs from the cooling devices according to the first and second embodiments in the configuration of the LT cooling water circulating system 60.

In the cooling device according to this embodiment, the LT cooling water circulating system 60 makes the LT cooling water circulate in the water cooling intercooler 62. A cooling water inlet of the water cooling intercooler 62 is connected to the cooling water outlet of the LT radiator 20 by the cooling water inlet pipe 16, and a cooling water outlet of the water cooling intercooler 62 is connected to the cooling water inlet of the LT radiator 20 by the cooling water discharge pipe 18. The electric water pump 26 that causes circulation of the LT cooling water is provided on the cooling water inlet pipe 16. The temperature sensor 28 that measures the temperature of the LT cooling water having passed through the water cooling intercooler 62 (outlet cooling water temperature) is attached to the cooling water discharge pipe 18. In this embodiment, the temperature of the LT cooling water means the outlet cooling water temperature measured by the temperature sensor 28.

The cooling device configured as described above and in embodiments of the present invention set forth in the claims correspond to each other as follows. That is, the LT cooling water circulating system 60 corresponds to the second cooling water circulating system, and the water cooling intercooler 62 corresponds to the intake air cooling means. The LT cooling water at the lower temperature circulated in the LT cooling water circulating system 60 is used for heat exchange with the intake air in the water cooling intercooler 62 to cool the intake air.

In this embodiment, the LT target water temperature is set for the LT cooling water circulated in the LT cooling water circulating system 60, and the LT flow rate is controlled to bring the temperature of the LT cooling water (outlet temperature measured by the temperature sensor 28) to the LT target water temperature. The LT target water temperature is set according to the engine load, the engine speed and the HT water temperature. The method of setting the LT target water temperature according to this embodiment is the same as that in the first embodiment, and description thereof will be omitted.

Other Embodiments

In the first embodiment, the threshold for the charging efficiency that separates the low temperature region and the high temperature region of the LT target water temperature is changed in two levels depending on whether the HT water temperature is higher than the predetermined temperature or not. However, according to some implementations of embodiments of the present invention, the low temperature region depending on the temperature of the HT cooling water can be set in any manner in that the low temperature region where the temperature of the HT cooling water is lower than the predetermined temperature is narrower in the direction toward higher loads than the low temperature region where the temperature of the HT cooling water is higher than the predetermined temperature.

For example, as shown by the solid line in FIG. 14, the threshold for the charging efficiency may be increased stepwise as the HT water temperature decreases, and may be reduced stepwise as the HT water temperature rises. In that case, the low temperature region becomes narrower stepwise in the direction toward higher charging efficiencies as the HT water temperature decreases, and becomes wider stepwise in the direction toward lower charging efficiencies as the HT water temperature rises. Alternatively, as shown by the solid line in FIG. 15, the threshold for the charging efficiency may be increased as the HT water temperature decreases, and may be reduced as the HT water temperature rises. In that case, the low temperature region becomes narrower in the direction toward higher charging efficiencies as the HT water temperature decreases, and becomes wider in the direction toward lower charging efficiencies as the HT water temperature rises. For comparison, the threshold for the charging efficiency set in the first embodiment is shown by the dashed line.

The threshold for the engine speed that separates the low temperature region and the high temperature region may be reduced stepwise as the HT water temperature decreases, and may be increased stepwise as the HT water temperature rises. In that case, the low temperature region becomes narrower stepwise in the direction toward lower engine speeds as the HT water temperature decreases, and becomes wider stepwise in the direction toward higher engine speeds as the HT water temperature rises. Alternatively, the threshold for the engine speed may be reduced as the HT water temperature decreases, and may be increased as the HT water temperature rises. In that case, the low temperature region becomes narrower in the direction toward lower engine speeds as the HT water temperature decreases, and becomes wider in the direction toward higher engine speeds as the HT water temperature rises.

The low temperature region and the high temperature region of the LT target water temperature may be separated only by the load (charging efficiency). That is, the high load region is not separated into the low temperature region and the high temperature region based on the engine speed, but the high load region can be the low temperature region over the entire range of the engine speed.

In the first embodiment, the LT target water temperature is discretely changed at the boundary between the low water temperature region and the high water temperature region. However, a region in which the LT target water temperature continuously changes may be provided between the low water temperature region and the high water temperature region. Furthermore, as far as the LT target water temperature is set lower than the high temperature region, the LT target water temperature in the low temperature region may be set in a distributed manner according to the load or engine speed. Furthermore, as far as the LT target water temperature is set higher than the low temperature region, the LT target water temperature in the high temperature region may be set in a distributed manner according to the load or engine speed.

What is claimed is:

1. A cooling device for an internal combustion engine, comprising:
    a first cooling water flow channel formed in a main unit of the internal combustion engine;
    an intake air cooling device of a water cooling type that cools an intake air;
    a first cooling water circulating system to make a first cooling water circulate in the first cooling water flow channel;
    a second cooling water circulating system that is separate from the first cooling water circulating system and is to make a second cooling water at a lower temperature than the first cooling water circulate through the intake air cooling device; and
    a controller that is configured to control operation of the second cooling water circulating system in accordance with a load and an engine speed of the internal combustion engine and a temperature of the first cooling water,
    wherein the controller is configured to
    control operation of the second cooling water circulating system so as to set the temperature of the second cooling water lower in a case where an operating point of the internal combustion engine, that is defined by the load and the engine speed, lies in a particular region in an operational region of the internal combustion engine, the particular region including a region in which the load is high and the engine speed is low, than in a case where the operating point lies outside of the particular region, and
    narrow the particular region in a direction toward higher loads in a case where the temperature of the first cooling water is lower than a predetermined temperature compared with a case where the temperature of the first cooling water is higher than the predetermined temperature.

2. The cooling device for an internal combustion engine according to claim 1, wherein the controller is configured to
    narrow the particular region in a direction toward lower engine speeds in the case where the temperature of the first cooling water is lower than the predetermined temperature compared with the case where the temperature of the first cooling water is higher than the predetermined temperature.

3. The cooling device for an internal combustion engine according to claim 1, wherein the intake air cooling device includes a second cooling water flow channel in which the second cooling water flows, the second cooling water flow channel being formed in a part of the main unit of the internal combustion engine such that the second cooling water flow channel has a greater effect on the temperature of the intake air than the first cooling water flow channel.

4. The cooling device for an internal combustion engine according to claim 3, wherein the second cooling water flow channel includes a flow channel that is formed in a cylinder head and is close to an intake port.

5. The cooling device for an internal combustion engine according to claim 3, wherein the second cooling water flow channel includes a flow channel that is formed in a cylinder block and is close to an upper part of a cylinder on an exhaust side.

6. The cooling device for an internal combustion engine according to claim 1, wherein a compressor is provided in an intake channel that is connected to the main unit of the internal combustion engine, and
    the intake air cooling device includes a heat exchanger that is provided in the intake channel downstream of the compressor and in which the second cooling water flows.

7. The cooling device for an internal combustion engine according to claim 6, wherein the heat exchanger is integrated with an intake manifold.

* * * * *